United States Patent [19]

Bennink

[11] 4,322,086
[45] Mar. 30, 1982

[54] HYDRAULIC OIL RESERVOIR VENT

[75] Inventor: Clarence C. Bennink, Ottumwa, Iowa

[73] Assignee: Deere & Company, Moline, Ill.

[21] Appl. No.: 130,389

[22] Filed: Mar. 14, 1980

[51] Int. Cl.³ .............................................. B60R 27/00
[52] U.S. Cl. .................................. 280/5 R; 280/5 A;
137/43; 137/354; 220/367
[58] Field of Search ............. 280/5 F, 5 H, 5 R, 5 A,
280/; 137/43, 354, 387; 220/202, 367, 85 VR

[56] References Cited

U.S. PATENT DOCUMENTS

| | | | |
|---|---|---|---|
| 3,054,525 | 9/1962 | Silvis | 280/5 H |
| 3,469,381 | 9/1969 | Burrough et al. | 180/6.3 X |
| 3,642,086 | 2/1972 | Andrews | 180/306 |
| 3,695,243 | 10/1972 | Torazza | 220/85 VR |
| 3,805,829 | 4/1974 | Yamamoto | 280/5 A |
| 3,832,837 | 9/1974 | Burkhart | 280/463 X |
| 4,159,749 | 7/1979 | Boushek | 180/305 |

FOREIGN PATENT DOCUMENTS 968647  9/1964  United Kingdom ............... 280/5 A

Primary Examiner—John A. Pekar

[57] ABSTRACT

A hydraulic oil reservoir for a mobile vehicle having the oil container of the reservoir formed in a beam of a horizontally disposed frame of the mobile vehicle. A vent assembly for the oil reservoir is comprised of a porous plug vent interconnected through a pair of hoses to two spaced openings in the top wall of the oil container. The interconnection of the two openings in the top wall of the reservoir enables the reservoir to be vented adequately while reducing the likelihood of oil expulsion through the vent when the vehicle is operated on a hillside terrain.

1 Claim, 4 Drawing Figures

HYDRAULIC OIL RESERVOIR VENT

BACKGROUND OF THE INVENTION

This invention relates to hydraulic systems for mobile vehicles and more particularly to an oil reservoir for hydraulic systems used to operate hydraulically actuated components of such mobile vehicles. While the invention has a wide variety of applications, one application where it provides particular utility is in mobile agricultural implements which are typically operated at a variety of attitudes relative to a horizontal plane.

One example of such an application is in a self-propelled windrower. In a prior art windrower disclosed in U.S. Pat. No. 3,469,381, a tubular beam of a horizontally disposed subframe of the windrower is used as an oil reservoir for the machine's hydraulic system. The use of a frame member as an oil reservoir has two basic advantages. The first is that the frame member acts as a large surface area heat sink for cooling the oil. Secondly, the necessity of providing an additional component for the reservoir function is avoided. One known means (described in more detail in connection with FIG. 4 hereinbelow) for venting an oil reservoir formed in a beam of the frame is to provide a pipe connected at one end to an opening in the top wall of the beam. The opposite end of the pipe is provided with a sintered metal porous plug for venting the reservoir while preventing contamination of the reservoir from the outside environment. It has been found that when such machines are used on hillside terrain such that the beam is disposed at an angle relative to a horizontal plane, the vent is subject to oil leakage when a hydraulic function such as raising and lowering the header of the windrower is actuated. The leakage occurs because this function requires the emptying of two single-action hydraulic cylinders into the reservoir and if the angle is sufficient, the outlet opening from the beam into the vent pipe is submerged. When the outlet opening is submerged in the oil and additional oil is injected into the reservoir, there is a rapid pressurization of the air space within the reservoir which acts to force oil through the porous metal vent to relieve the increased pressure.

Accordingly, it is an object of this invention to provide an improved oil reservoir which may be used over a wide range of dispositions or attitudes relative to a horizontal plane without being subject to expulsion of oil from the reservoir vent.

Another object of this invention is to provide an improved oil reservoir which can use a high oil level within the reservoir, without oil expulsion, even though the reservoir is subjected to a wide range of dispositions relative to a horizontal plane during operation.

Still another object of this invention is to provide an oil reservoir of the aforementioned type which requires less maintenance and reduces the risk of oil contamination because the need to add oil to the reservoir is substantially reduced or eliminated.

Still another object of this invention is to provide an oil reservoir of the aforementioned type which provides improved vehicle or machine appearance as the collection of dust and dirt on the machine is reduced with the reduced or eliminated oil leakage.

BRIEF DESCRIPTION OF THE INVENTION

These and other objects of the invention, which will be apparent from a review of the following detailed description and accompanying claims, are accomplished by an improved oil reservoir comprised of an oil container and vent assembly. The vent assembly is comprised of first and second conduit means, each connected, respectively, at one end to first and second spaced openings in the top wall of the container and at the other end to a vent for venting the oil container while at the same time preventing contamination of it. Known vent types having the properties of substantially reducing the risk of contamination of the oil reservoir and providing adequate venting of the container may be used to practice the invention. The oil reservoir is designed and the oil level is chosen such that, during the disposition of the oil reservoir within the expected range of dispositions during field use of the mobile implement, at least one of the vent openings in the top wall of the reservoir is open to the air volume of the container. By interconnection of the two vent outlet openings from the container through the conduit means to a vent, it has been found that, with oil surges into the reservoir during operation of the hydraulic system, oil leakage is avoided by pressurization of the air volume of the conduit means and vent passageways through the unsubmerged opening. The pressurization prevents oil from being expelled from the vent by being pushed up through the submerged container opening and conduit means to the vent. The excess pressure is then gradually dissipated through the unsubmerged container opening, the associated conduit means and the vent.

DESCRIPTION OF THE PREFERRED EMBODIMENT

As used herein terms such as "forward", "rearward", "vertical", "horizontal" and "transverse" are used for convenience and are determined by reference to the machine when supported on level ground (i.e., a horizontal plane) in its standard operating position and relative to the direction of forward travel. The terms "left" and "right" are determined by standing at the rear of the machine and facing in the direction of travel.

Figure 1:
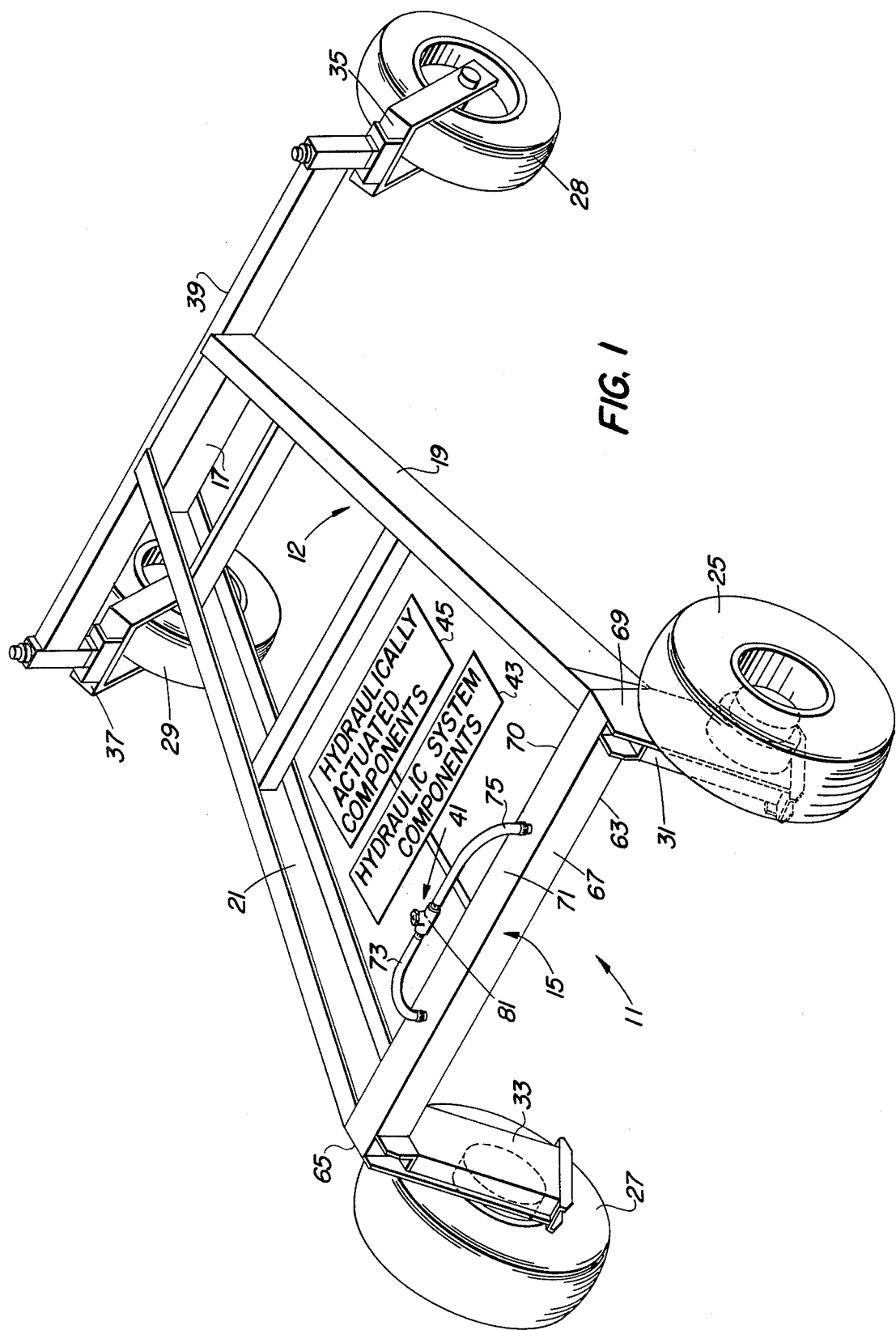
FIG. 1 is a fragmentary perspective view of a frame for a mobile vehicle having an oil reservoir in accordance with the features of this invention.
Figure 3:
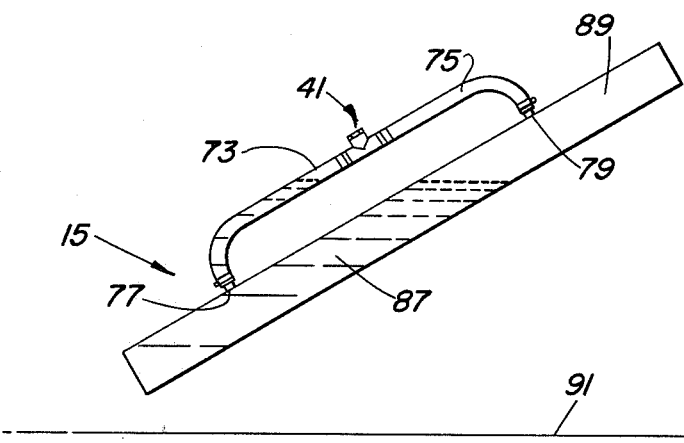
FIG. 3 is a schematic view of the oil reservoir of FIGS. 1, 2 illustrating the operation thereof when disposed at an angle relative to a horizontal plane.
Figure 2:
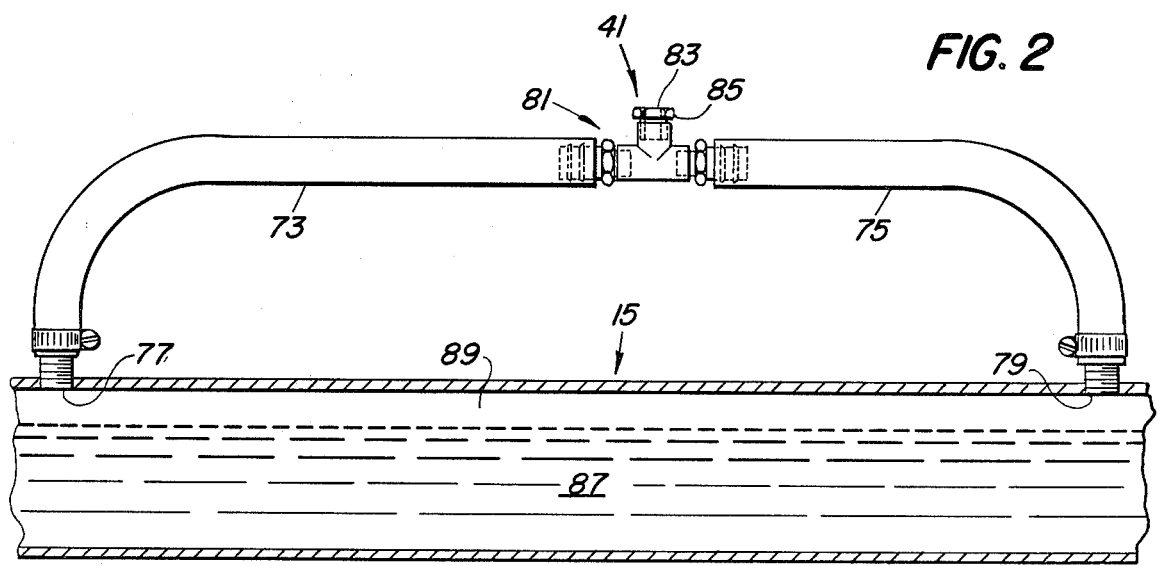
FIG. 2 is a fragmentary front-end view of the oil reservoir of the mobile vehicle frame shown in FIG. 1.

This invention has application to a wide variety of mobile vehicles with hydraulically controlled components. It has particular utility in connection with mobile agricultural implements. A preferred embodiment of this invention is illustrated in FIGS. 1-3 in connection with a self-propelled windrower. For convenience, only a frame 11 of the traction unit of the windrower is illustrated in FIGS. 1 and 2. As is well-known, a windrower traction unit carries a forward, transversely elongated, vertically adjustable harvesting platform for severing a standing crop from a field and converging it for deposit in a windrow as the machine advances across the field. Many of the windrower components (or functions) such as vertical adjustment of the platform and the front wheel drive are hydrically actuated or controlled. An illustrative embodiment of a traction unit of the type with which this invention has particular utility is described in considerably more detail in U.S. Pat. No. 4,159,749, the disclosure of which is hereby incorporated by reference herein. The traction unit to be described herein is identical to that disclosed in U.S. Pat. No. 4,159,749 except for the oil reservoir to be described hereinbelow in accordance with the features of this invention.

As shown in FIG. 1, traction unit frame 11 includes a generally horizontally disposed subframe 12 including a transverse front beam or frame member 15 that is made of conventional steel tubing with a rectangular cross-section. A relatively short transverse beam 17 is disposed at the rearward end of subframe 12. Side beams 19, 21 respectively interconnect the opposite ends of front and rear beams 15, 17. Side beams 19, 21 are channel shaped with the open side opening toward the interior of frame 11. Frame 11, including subframe 12, may be assembled by welding or other conventional means.

Frame 11 is supported for movement across the ground on a set of wheels including a pair of hydraulically driven front wheels 25, 27 and a pair of undriven rear wheels 28, 29. Front wheels 25, 27 and rear wheels 28, 29 are attached, respectively, to subframe 12 in a conventional manner via front wheel supports 31, 33 and rear wheel supports 35, 37. Rear wheel supports 35, 37 are interconnected by a transverse frame member 39 fixed to rear beam 17.

In accordance with the features of this invention as shown in FIGS. 1, 2, front beam 15 is fluid tight and constitutes the oil-containing portion of the oil reservoir of a hydraulic system for hydraulically actuated components 45 of the windrower. The hydraulically actuated components 45 and their means for interconnection (not shown) to the front beam and to the other components 43 of the hydraulic system except for the oil reservoir constituted by front beam 15 and a vent assembly 41 of the oil reservoir are conventional and have been illustrated block-diagramatically for simplicity. The oil reservoir is interconnected to the other hydraulic system components 43 through conventional means (not shown).

The beam or container 15 is comprised of rectangular cross-section steel tubing including a bottom wall 63, side walls 65, 67, 69, 70 and top wall 71. Vent assembly 41 is comprised of first and second flexible hose or conduit means 73, 75. One end of each hose segment 73, 75 is connected respectively, by welding in first and second spaced openings 77, 79 (FIG. 2) formed in top wall 71. A "T"-shaped vent coupling 81 is interconnected respectively between the second ends of hose segments 73, 75. A porous sintered metal vent plug 83 is press fitted into a cap 85 mounted in the third leg of "T"-shaped coupling 81 for restricting the flow of air into and out of first and second hose segments 73, 75 and for preventing contamination of the reservoir.

Figure 4:
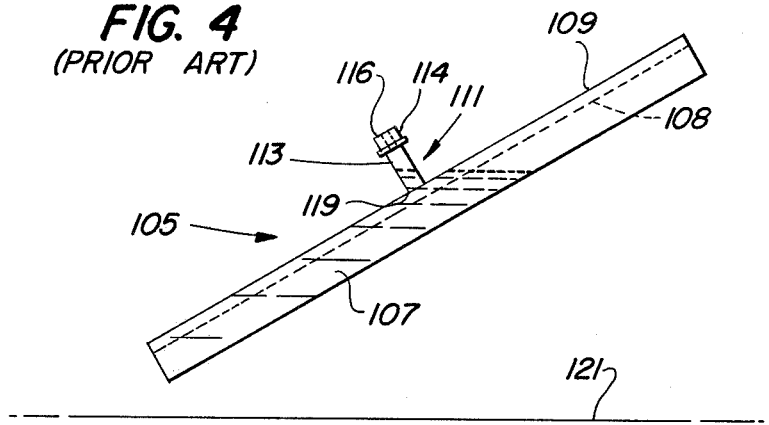
FIG. 4 is a schematic view of a prior art oil reservoir illustrating the operation thereof when disposed at an angle relative to a horizontal plane.

In operation, tubular beam 15 encloses or defines a first or total volume comprised of a second volume of oil 87 and a third volume 89 of air. These volumes are, of course, determined by the capacity and design of the hydraulic system. One design consideration is that as the windrower is driven on a hillside, the reservoir outlets (not shown) to the hydraulic system remain submerged in oil through the expected range of attitudes of the windrower relative to a horizontal plane to prevent pump cavitation. In addition, at least one of the openings 77, 79 should always be exposed to air volume 89 of the reservoir. By way of example, as illustrated in FIG. 3, when the windrower is on a hillside inclined at about a slope of 30% with respect to a horizontal plane 91, the oil volume 87 is shifted, which submerges opening 77 while opening 79 remains open to air volume 89. Thus, in accordance with the features of this invention, if a hydraulic system component 43, such as a single-acting cylinder or any other function which returns additional oil to the reservoir, is operated, air volume 89 in the reservoir is slightly compressed. This pressure, in turn, is transmitted into vent assembly 41 to pressurize the air volumes in hoses 73, 75 and coupler 81. Thereafter the pressure is gradually released through vent plug 83 without the expulsion of oil from hose 73 as might occur with a prior art reservoir 105 schematically shown in FIG. 4. In FIG. 4 the prior art reservoir 105 accommodates a first volume 107 of oil indicated by a line 108 (for a horizontal disposition) and a second, air volume 109 which together constitute the total volume of reservoir 105 in a horizontal disposition. The reservoir further includes a vent assembly 111 comprising a conduit 113 and a cap 114 into which a porous metallic plug 116 is press fitted. Conduit 113 is fixed in an opening 119 of reservoir 105. When the reservoir 105 is inclined relative to a horizontal plane 121 by the driving of the windrower on a hillside, oil volume 107 is shifted such that opening 119 is submerged in oil. In the range of machine attitudes which submerges opening 119, there is a possibility that oil may be expelled from the vent by the actuation of a hydraulic function which returns additional oil to the reservoir to pressurize air volume 109 within reservoir 105. If the additional oil is of sufficient volume (that is, the increased pressurization of air volume 109 within the reservoir is large enough), oil is expelled through vent assembly 111 as the air pressure cannot be properly vented because opening 110 is submerged.

As can be seen in accordance with the features of this invention, vent assembly 41 by its design always has at least one opening 71, 73 exposed to the air volume within the reservoir over a wide range of machine attitudes to permit pressurization of the air volume of vent assembly 41 and to provide a path for release of the increased pressurization through plug 83 without expulsion of oil from the reservoir. It will also be clear that relative to the prior art, the invention herein enables the maintenance of the oil in the reservoir at a higher level without leakage. The invention also permits the dual functioning of a frame member as a stuctural support and as an oil reservoir despite its transversely elongated shape. Still further, oil loss from vent assembly 41 of the reservoir is eliminated over a wide range of attitudes of the machine.

It will be appreciated by those skilled in the art that the invention has been explained in connection with a preferred embodiment thereof as would be used in a mobile agricultural implement and that there are a wide variety of other applications and design variations of the invention. Accordingly, it is intended that the appended claims cover all such variations and applications as are within the true spirit and scope of the invention.

What is claimed is:

1. In a mobile vehicle comprising:
   (a) a tubular frame including an elongated beam;
   (b) a set of wheels supporting said frame, said beam being substantially parallel to a plane when said wheels are in contact with said plane;

(c) a hydraulically controlled component mounted on said frame;
(d) a hydraulic system for operating said component and including an oil reservoir, said beam forming an oil reservoir container wherein the improvement comprises:
said beam including an upper wall portion defining first and second spaced openings,
said reservoir further including (1) first and second conduit means, each having a first end connected, respectively, to said first and second openings and (2) a T-shaped vent coupling for restricting the flow of air into and out of said first and second conduit means, said coupling comprising pair of oppositely extending tubular legs interconnected between a second end of each of said first and second conduit means, a third tubular leg connected at one end to said pair of legs and a porous plug cap mounted in the other end of said third leg.

* * * * *